(12) United States Patent
Lille

(10) Patent No.: US 7,990,647 B2
(45) Date of Patent: Aug. 2, 2011

(54) THERMALLY ASSISTED RECORDING HEAD CONTROL MEANS FOR PROTRUSION MANAGEMENT

(75) Inventor: Jeffrey S. Lille, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 279 days.

(21) Appl. No.: 12/217,379

(22) Filed: Jul. 3, 2008

(65) Prior Publication Data

US 2010/0002330 A1 Jan. 7, 2010

(51) Int. Cl.
*G11B 5/02* (2006.01)
*G11B 21/02* (2006.01)
(52) U.S. Cl. ............................ 360/59; 360/75
(58) Field of Classification Search .................. None
See application file for complete search history.

(56) References Cited

U.S. PATENT DOCUMENTS

| | | | |
|---|---|---|---|
| 5,581,535 A | 12/1996 | Saito et al. | |
| 6,950,260 B2 | 9/2005 | Coffey et al. | |
| 6,970,400 B1 | 11/2005 | Wakabayashi et al. | |
| 6,975,472 B2 | 12/2005 | Stover et al. | |
| 6,982,843 B2 | 1/2006 | Coffey et al. | |
| 7,099,097 B2 * | 8/2006 | Hamaguchi et al. | 360/59 |
| 7,133,254 B2 | 11/2006 | Hamann et al. | |
| 7,375,914 B1 * | 5/2008 | Dieron et al. | 360/75 |
| 2003/0058559 A1 | 3/2003 | Brand et al. | |
| 2005/0105204 A1 | 5/2005 | Bloodworth et al. | |
| 2006/0056091 A1 | 3/2006 | Nagano et al. | |
| 2006/0153046 A1 | 7/2006 | Meinders et al. | |
| 2006/0268445 A1 | 11/2006 | Brannon et al. | |
| 2007/0139818 A1 | 6/2007 | Shimazawa et al. | |
| 2008/0149809 A1 * | 6/2008 | Hamann et al. | 250/201.1 |

OTHER PUBLICATIONS

Brain E Schultz, Thermal Fly Height Control in Hitachi Hard Disk Drives, Hitachi White Paper, May 2006.
Xu et al., Thermal Effects of Heated magnetic Disk on the Slider in Heat Assisted Magnetic Recording, J of Applied Phys., Nov. 2, 2005, 99, 08N102.
Black et al., Thermal Management in Heat Assisted Magnetic Recording, IEEE Trans Magn., Jan. 2007, vol. 43, No. 1.
Li et al., HAMR and Mechanical Stability of It's Head Disk Interface, INTERMAG Asia 2005, IEEE International Paper HBO6.

* cited by examiner

*Primary Examiner* — Daniell L Negrón
*Assistant Examiner* — Regina N Holder
(74) *Attorney, Agent, or Firm* — D'Arcy H. Lorimer; Lorimer Labs

(57) ABSTRACT

Methods and structures for improving fly height control for thin film write heads utilized in thermally assisted recording are disclosed. Methods include the use of the TAR near field light source to provide a preheating pulse to improve the transient response when moving from one fly height to another prior to writing data. Methods and structures having an additional auxiliary optical heating source to avoid media overheating and replacement of embedded resistive heaters are also disclosed.

9 Claims, 15 Drawing Sheets

THERMALLY ASSISTED RECORDING HEAD CONTROL MEANS FOR PROTRUSION MANAGEMENT

BACKGROUND OF THE INVENTION

1. Field of the Invention

This invention relates to structures of thin film magnetic write heads. More specifically, the invention relates to control methods and structures of thin film write heads for thermally assisted recording, having integrated thermal fly height control.

2. Description of the Related Art

The ongoing quest for higher storage bit densities in magnetic media used in, for example, hard disk drives, have reduced the size (volume) of data cells to the point where the cell dimensions are on the order of the grain size of the magnetic material. For cells this small, there is concern that data stored within the cells is no longer thermally stable over long periods of time, as random thermal fluctuations at ambient temperatures are sufficient to erase data. This state is described as the superparamagnetic limit, which determines the maximum theoretical storage density for a given magnetic media. This limit may be raised by increasing the coercivity of the magnetic media or lowering the temperature. Lowering the temperature is not a practical option when designing hard disk drives for commercial and consumer use. Raising the coercivity is a practical solution, but requires write heads employing higher magnetic moment materials, or techniques such as perpendicular recording (or both).

One additional solution has been proposed, which employs heat to lower the effective coercivity of a localized region on the magnetic media surface; writes data within this heated region, where the local coercivity is lower, with a broad (and somewhat lower strength) magnetic field; and, stores the data state by cooling the media to ambient temperatures, where the coercivity returns to the quiescent high value. This technique is broadly referred to as "thermally assisted (magnetic) recording", TAR or TAMR. It can be applied to both longitudinal or perpendicular recording systems, although the highest density state of the art storage systems are more likely to be perpendicular recording systems. Heating of the media surface is accomplished by a number of techniques such as focused laser beams or near field optical sources.

Another important feature integrated into today's magnetic heads includes a heating element and control system to adjust the fly height of the head. This is done by thermally deforming the head, via thermal expansion, in a controlled manner to fine tune the actual position of the ABS (air bearing surface) relative to the media surface. Typical heads undergoing this thermal deformation are shown in FIGS. 1 and 2 (Prior Art).

FIG. 1 (Prior Art) is a partial cross sectional view 100 of a typical thin film longitudinal head with thermal fly height control (TFC), wherein the write head comprises write gap 112 bounded by upper 110 and lower 108 pole tips. Upper pole tip 110 is in contact with upper return pole layer 114. Lower pole tip 108 is in contact with lower return pole layer 106. Lower return pole layer is separated from shield layer 102 by insulating layer 104. The coil is shown as structure 116, embedded in insulating layer 118, which may also be referred to as an overcoat layer. The read head comprises a MR (magneto-resistive) sensor 103 located between upper 102 and lower 101 shield layers. Shield layer 101 is supported by undercoat layer 120 and an AlTiC base layer 122. A thermal heater (not shown) is utilized to heat the head. The heating causes thermal expansion of the head components, which results in movement of the air bearing surface (ABS) toward the media, reducing the effective fly height (or the head to media clearance). The dashed line labeled $ABS_c$ in FIG. 1 represents the position of the air bearing surface of the head unheated, whereas the dashed line $ABS_h$ represents the position of the air bearing surface when heated. The magnitude of the expansion effect can be controlled by the amount of heat added and the resulting temperature of the head components, effectively adjusting the fly-height to the desired level. Lowering of the fly height is generally desirable during the write process, but may not be required for reading data or moving from one sector to another. In the latter cases, it is desirable to increase the fly height to reduce the potential to contact asperities on the media surface which could cause head damage.

FIG. 2 (Prior Art) is a partial, cross sectional view 200 of a typical thin film perpendicular head with thermal fly height control (TFC). The head comprises shield layers 202, 204, MR sensor 203, shaping layer 210, coil structure 208, main pole 212, lower return pole layer 206, wrap around shield 214, and upper return pole layer 216. Alternatively, structure 214 may also be a trailing shield. Shield layer 202 is supported by undercoat layer 218 and an AlTiC base layer 220. Details of wrap around shields and trailing shields, as applied to perpendicular recording heads, can be found in, for example, US Patent Application Publications 2007/0146930, 2007/0115584, 2006/0174474, 2006/0044682, and 2007/0137027. The dashed line labeled $ABS_c$ in FIG. 2 represents the position of the air bearing surface of the head unheated, whereas the dashed line $ABS_h$ represents the position of the air bearing surface when heated. As with the longitudinal head described above, the magnitude of the expansion effect can be controlled by the amount of heat added and the resulting temperature of the head components, effectively adjusting the fly height to the desired level.

Conventional heads, such as those shown in FIGS. 1 and 2 (Prior Art), having thermal flight control (TFC) systems usually employ resistive heaters imbedded within the head structure, which depend on thermal conduction to apply heat to the critical read and write structures at the ABS. One difficulty in this approach results from the transient delays that occur when power levels to the TFC heaters are changed to heat or cool the head in response to desired fly height corrections. For example, it is often required to reduce the fly height in zones where writing of data is desired. Lowering the fly height requires heating the head to increase the temperature. However, simply increasing the TFC heater power level to it's nominal steady state value may not cause the desired temperature change to occur fast enough, due to thermal delays in the head structure. A solution has been proposed in US patent application publication 20050057841A1, wherein a power pulse is applied to the TFC heater immediately prior to the data write zone. This process is illustrated in FIG. 7 (Prior Art).

FIG. 7 (Prior Art) is a sequence of charts 700, 702, 704, and 706 illustrating write coil power, TFC power, head temperature, and fly height as a function of time during a data write cycle. Chart 700 shows average write coil power for data being written between times $t_2$ and $t_3$ as the head flies over the media surface. The charts shows normalized average power. The actual average power will vary from sector to sector, depending on the duty cycle and profile of the data written. The instantaneous coil power levels are not shown for simplicity, as the detail is unnecessary when considering the heat generated by the coil during any write cycle. Chart 702 shows the TFC power levels. A power level of $P_0$ is used to obtain a temperature of $T_1$ in the head, resulting in a fly height of $H_2$ (see charts 704, 706). At time $t_1$, a pulse of power $P_1$ is applied to the TFC heaters to shorten the response time of the heating process. The pulse is terminated as the coil power comes on at $t_2$. The pulse combined with the coil power raises the head temperature to $T_2$ (chart 704) and lowers the fly height from $H_2$ to $H_1$ during time period $t_2$ to $t_3$, as data is being written.

The difficulty with the proposed process of FIG. 7 (Prior Art) is that while it reduces the transient response time somewhat, it really does not address the thermal delays due to the location and thermal mass of the heaters. Furthermore, applying high power pulses to a system with high thermal inertia can create thermal oscillation and control difficulties. Adding TAR heat sources further complicate the thermal management of the head, as these sources will be on only during write cycles.

What is needed is an improved method for thermal fly height control with write heads having thermally assisted recording.

SUMMARY OF THE INVENTION

It is an object of the present invention to provide a method for writing data with a thin film magnetic head having a thermally assisted recording system and resistive heaters operable to heat said thin film magnetic head. The method includes providing a first optical power level to the thermally assisted recording system between a first time $t_1$ and a second time $t_2$; providing a second optical power level to the thermally assisted recording system between the second time $t_2$ and a third time $t_3$, the first optical power level being greater than the second optical power level; and, writing data between the second time $t_2$ and the third time $t_3$.

It is another object of the present invention to provide a method for writing data with a thin film magnetic head having a thermally assisted recording system and an auxiliary optical system operable to heat the thin film magnetic head. The method includes providing a first optical power level to the auxiliary optical system between a first time $t_1$ and a second time $t_2$; providing a second optical power level to the auxiliary optical system between the second time $t_2$ and a third time $t_3$, the first optical power level being greater than the second optical power level; and, providing a third optical power level to the thermally assisted recording system between the second time $t_2$ and the third time $t_3$; and, writing data between the second time $t_2$ and the third time $t_3$.

It is yet another object of the present invention to provide a thin film magnetic head structure including a near field optical source comprising a conductive metal film, an aperture fashioned in the conductive film; a first optical waveguide operable to illuminate the aperture, producing a near field light source suitable for thermally assisted recording; and, a second optical waveguide operable to illuminate a light absorption structure embedded within said thin film magnetic head, the light absorption structure suitable for converting light energy transmitted by the second optical waveguide to thermal energy, wherein control of the light energy is operable to alter protrusion of the thin film magnetic head structure at the air bearing surface of the thin film head.

BRIEF DESCRIPTION OF THE DRAWINGS

The present invention will be better understood when consideration is given to the following detailed description thereof. Such description makes reference to the annexed drawings, wherein.

DETAILED DESCRIPTION OF THE PREFERRED EMBODIMENTS

Figure 1:
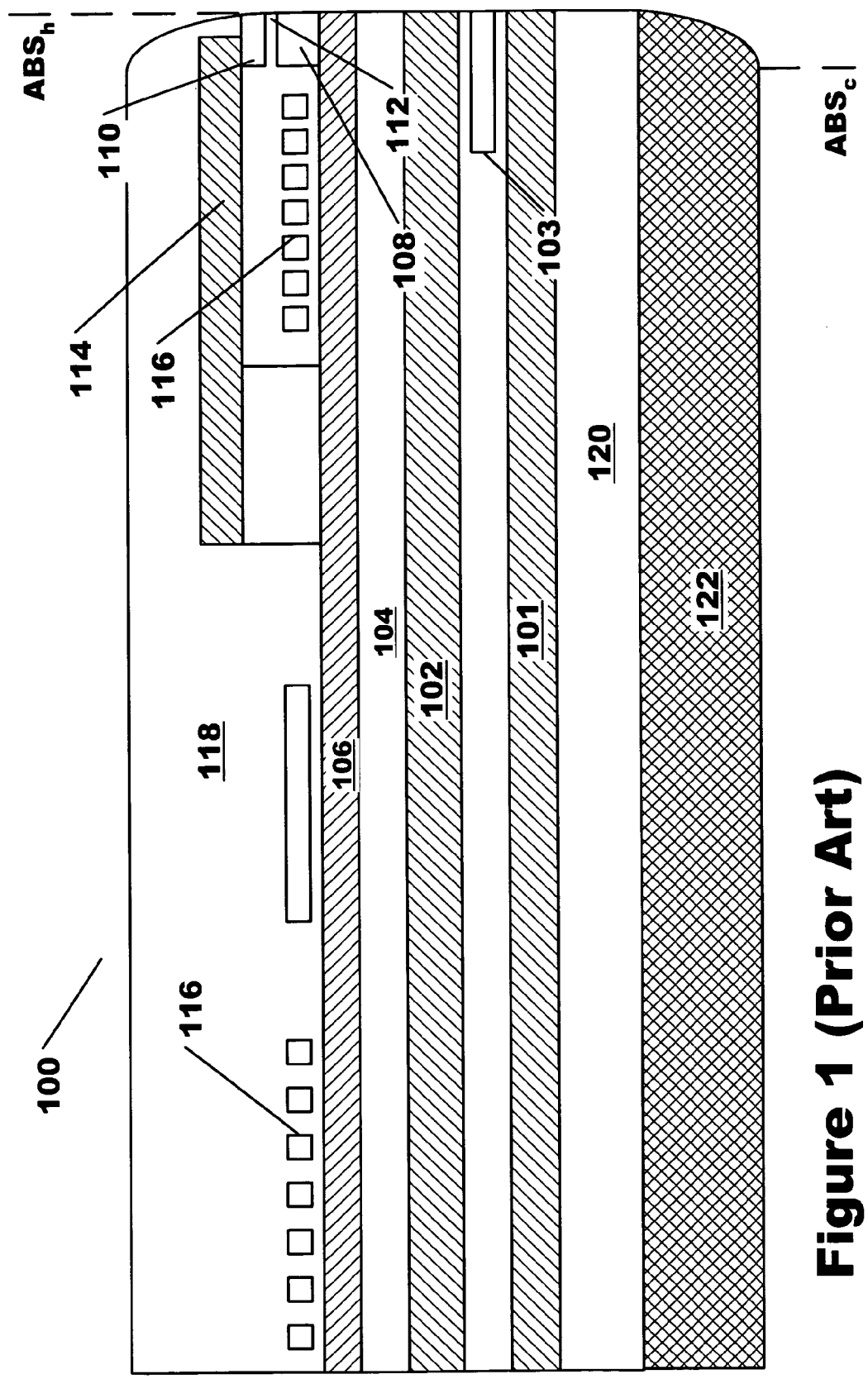
FIG. 1 (Prior Art) is a partial cross sectional view 100 of a typical thin film longitudinal head with thermal fly-height control (TFC)
Figure 2:
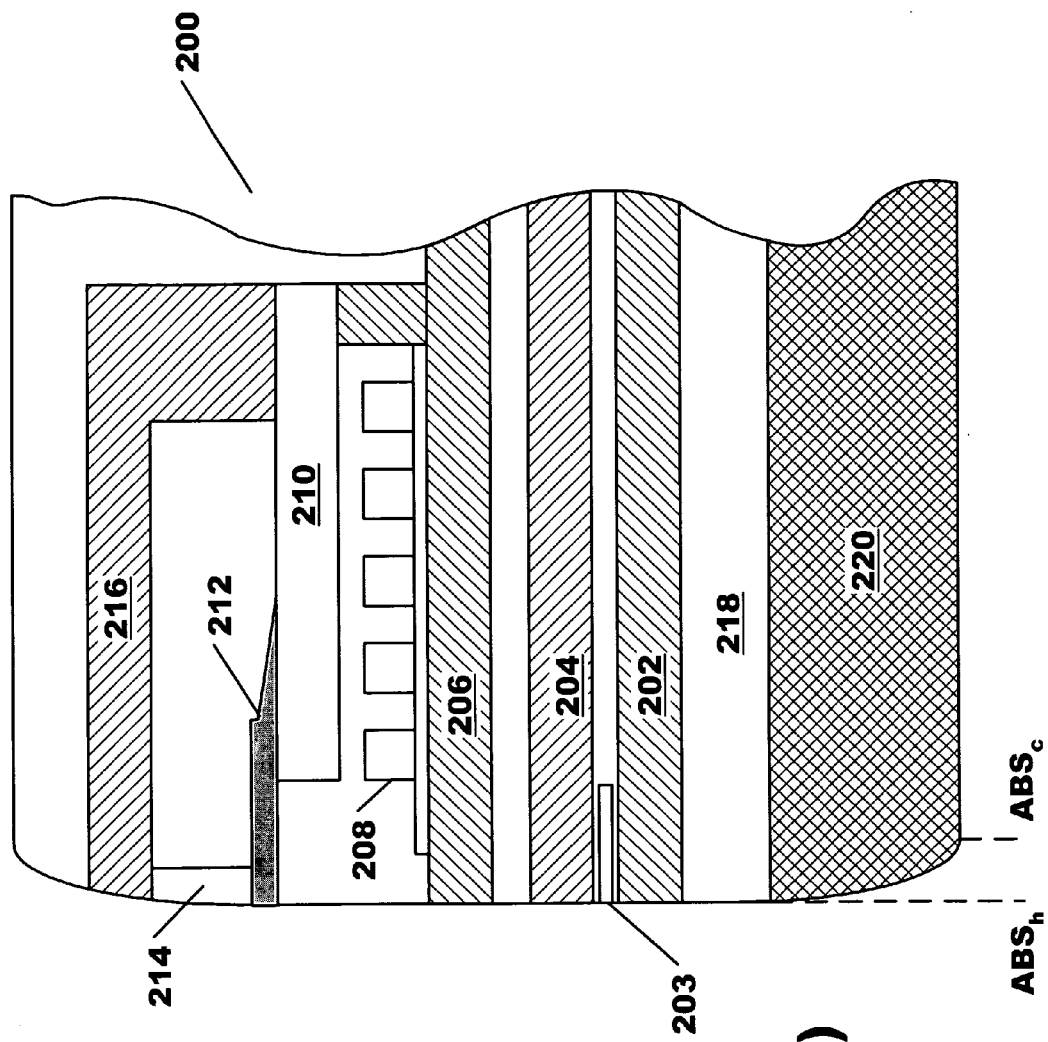
FIG. 2 (Prior Art) is a partial, cross sectional view 200 of a typical thin film perpendicular head with thermal fly-height control (TFC)
Figure 7:
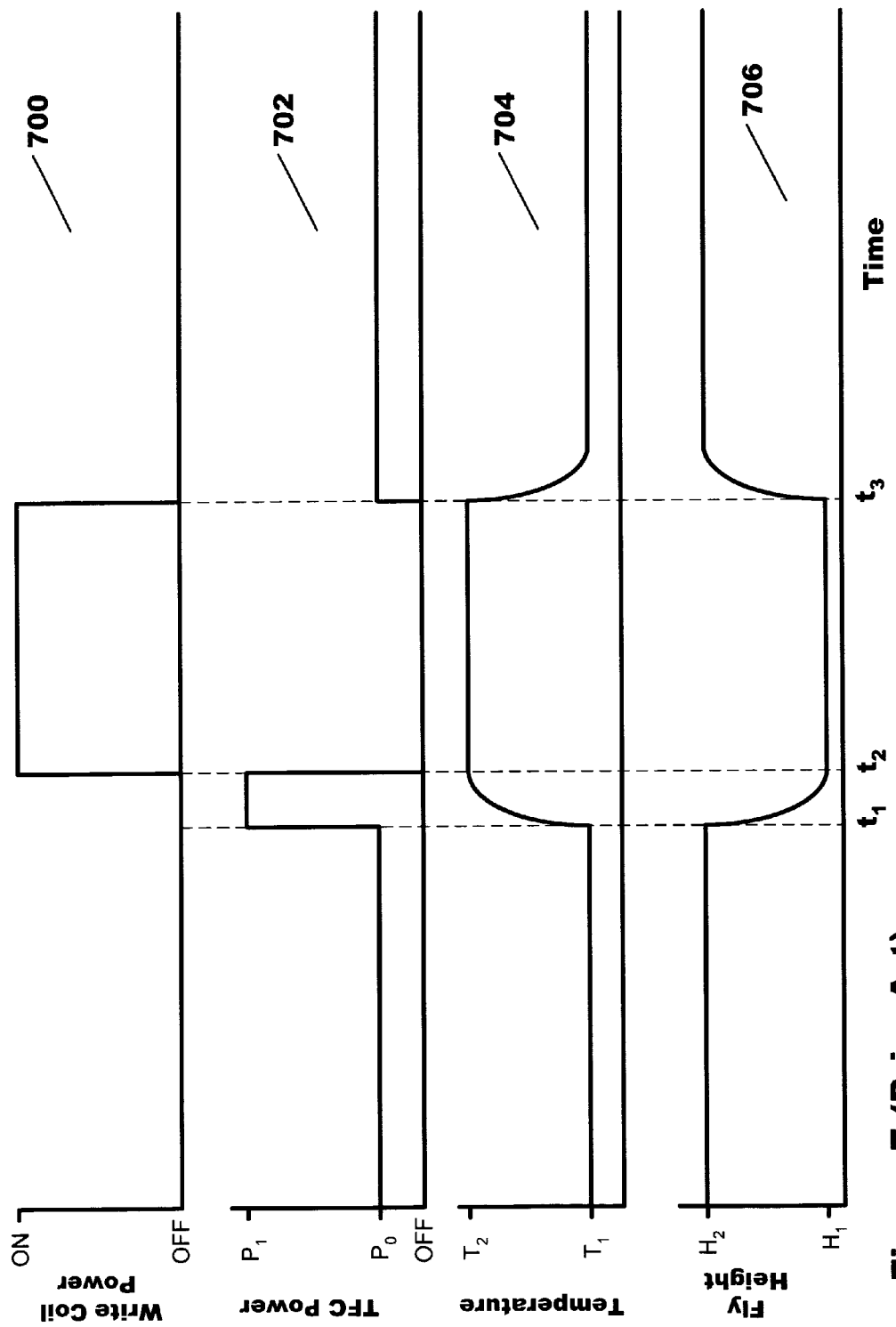
FIG. 7 (Prior Art) is a sequence of charts 700, 702, 704, and 706 illustrating write coil power, TFC power, head temperature, and fly height as a function of time during a data write cycle.

FIGS. 1, 2, and 7 (Prior Art) have been discussed above.

Figure 3A:
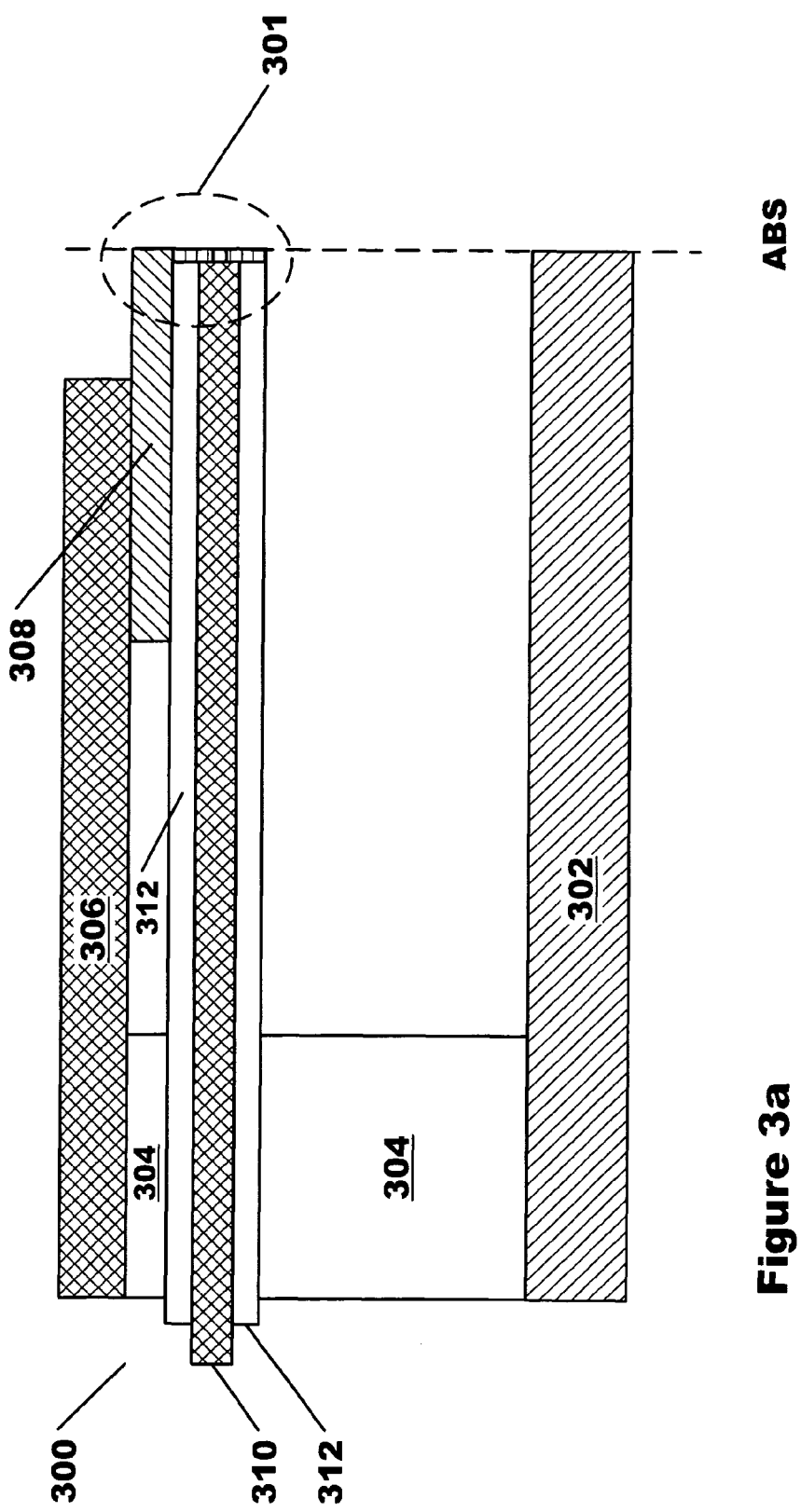
FIG. 3a is a partial cross section view of a thin film head having resistive heating TFC and TAR, in accordance with an embodiment of the present invention.

FIG. 3a is a partial cross section view 300 of a thin film head having resistive heating TFC and TAR, in accordance with an embodiment of the present invention. To improve clarity and emphasize important features of the present invention, certain details such as the coil structure, spacer layers, shielding layers, and read sensors have been omitted from FIG. 3a (and subsequent FIGS. 3b-d, 4a-b, 5a-b, and 6). The configuration and structure of the omitted details are well known to those skilled in the art. Also not illustrated are details regarding the resistive heaters, as these are typically placed outside the view of the illustrated features of FIGS. 3-6.

Returning to FIG. 3a, the write head comprises lower return pole layer 302, back-gap layer(s) 304, upper return pole layer 306, upper pole tip layer 308. Lower return pole layer 302 may also have a lower pole tip (not shown) at the ABS. An optical waveguide for TAR comprises layers 310 and 312. Layer 310 is an optical waveguide core, surrounded by cladding layers 312. Layers 310 and 312 extend through at least a portion of back-gap layers 304, although alternate placement of the backgap is also possible. Detail 301 is shown in an expanded view in FIG. 3b. Coil layers (not shown) and various insulating and spacer layers (not shown) would reside in the cavity bounded by the ABS, back-gap 304, lower return pole 302, and upper bounding layers 306, 308, and 312 as would be recognized by those of skill in the art. Layers 302, 304, 306, and 308 are comprised of a suitable magnetic alloy or material, containing ternary alloys of Co, Ni, and Fe, or binary alloys of Co/Fe and Ni/Fe. Layer 310 is comprised of a suitable light transmitting material, preferably tantalum pentoxide and/or titanium dioxide. As shown, the core layer 310 has approximately uniform cross section along its length. As well known in the art, the optical waveguide can have a number of other possible designs including a planar solid immersion mirror or planar solid immersion lens which have a non-uniform core cross section along the waveguide's length.

Figure 3B:
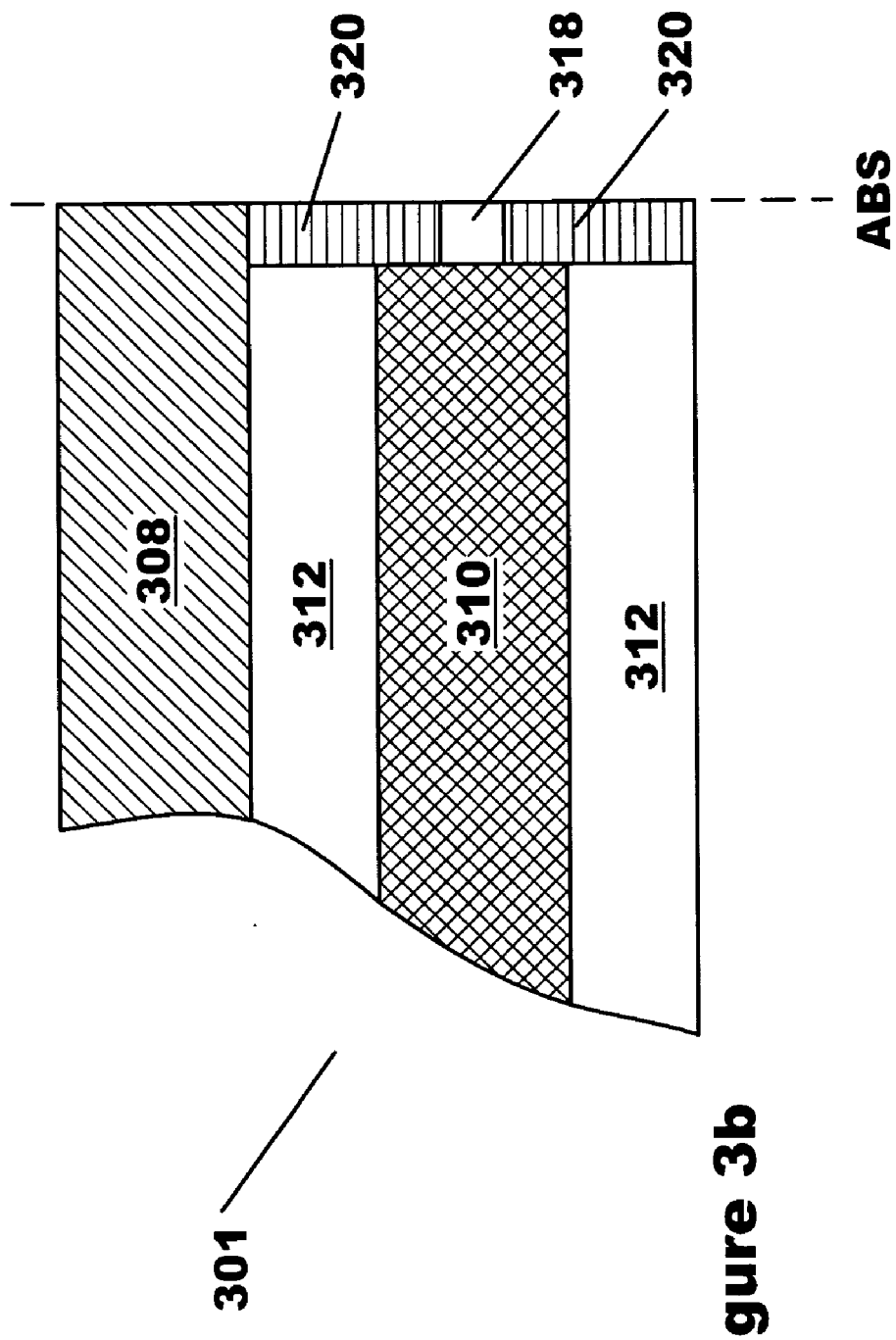
FIG. 3b is a partial cross section view of detail 301 of FIG. 3a, in accordance with an embodiment of the present invention.
Figure 4A:
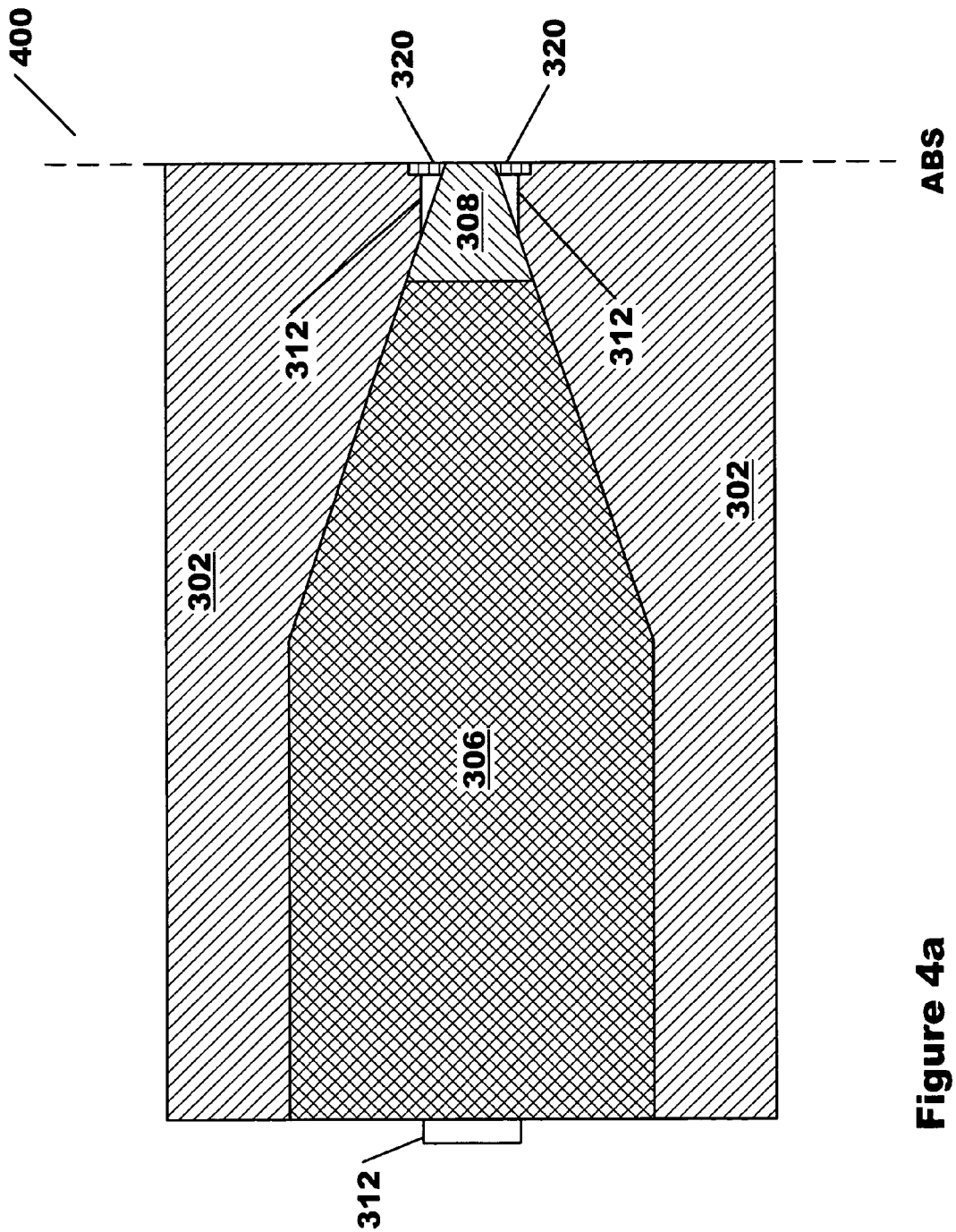
FIG. 4a is a partial plan view of the thin film head of FIG. 3a, in accordance with an embodiment of the present invention.
Figure 5A:
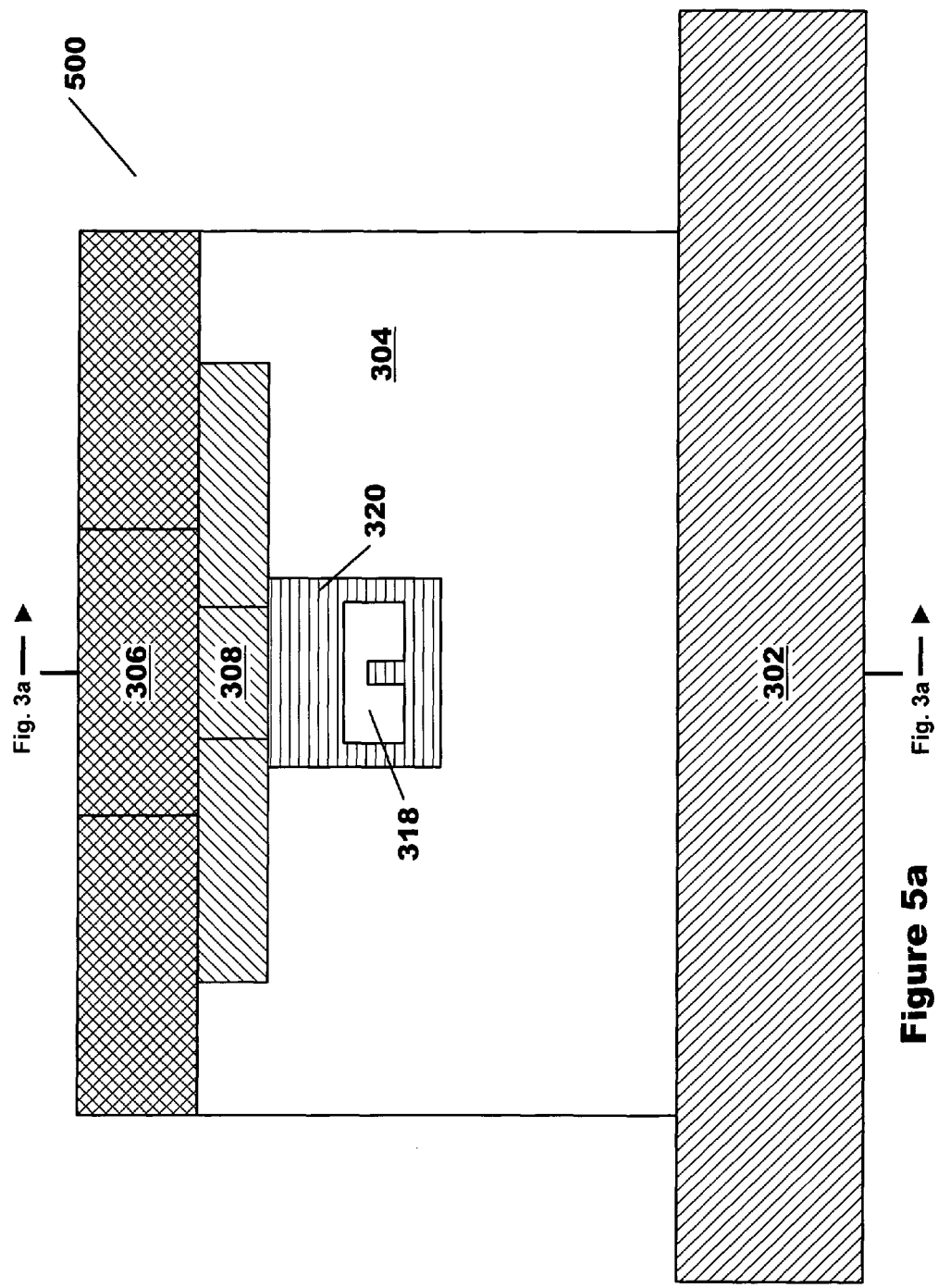
FIG. 5a is a partial air bearing surface view of the thin film head of FIG. 3a, in accordance with an embodiment of the present invention.

FIG. 3b is a partial cross section view of detail 301 of FIG. 3a, in accordance with an embodiment of the present invention. C aperture 318 (also known as a ridge aperture), and surrounding metal layer 320 comprise the near field optical source utilized for thermally assisted recording, which is supplied light energy via optical waveguide core 310. Metal layer 320 is made of Cu, Au, Ag, Pt, Rh, Ru, Pd or their alloys. Cladding layer 312 thickness is nominally about 200 nm, but may be thicker or thinner depending on the dimensions of other layers in the structure. FIG. 4a is a partial plan view 400 of the thin film head of FIG. 3a, in accordance with an embodiment of the present invention. FIG. 5a is a partial air bearing surface view 500 of the thin film head of FIG. 3a, in accordance with an embodiment of the present invention. A light source (not shown) is coupled by suitable, optically transparent conduit to optical waveguide core 310 by methods well known in the art. The light source is typically a laser producing light of the appropriate wavelength, which is matched to the characteristics of the ridge aperture near field light source.

The thermally assisted recording (TAR) components of the foregoing embodiments (laser light source; optical waveguide components 310, 312; and near field light source components 318, 320) provide a heat source in addition to the resistive heaters (not shown) normally used for TFC, and the heating provided by the write coil (not shown). Since the near field light source is only about 10% efficient, most of the optical energy is delivered to the head as heat. This property can be utilized to advantage to offset energy normally supplied by the resistive heaters, with an additional advantage of faster thermal response due to the termination of the optical waveguide near the ABS. The thermal spike delivered by resistive heaters in FIG. 7 (Prior Art) between $t_1$ and $t_2$ can be replaced by a shorter duration pulse delivered by the TAR system of the present invention, with the advantage being a much faster response time.

Figure 8:
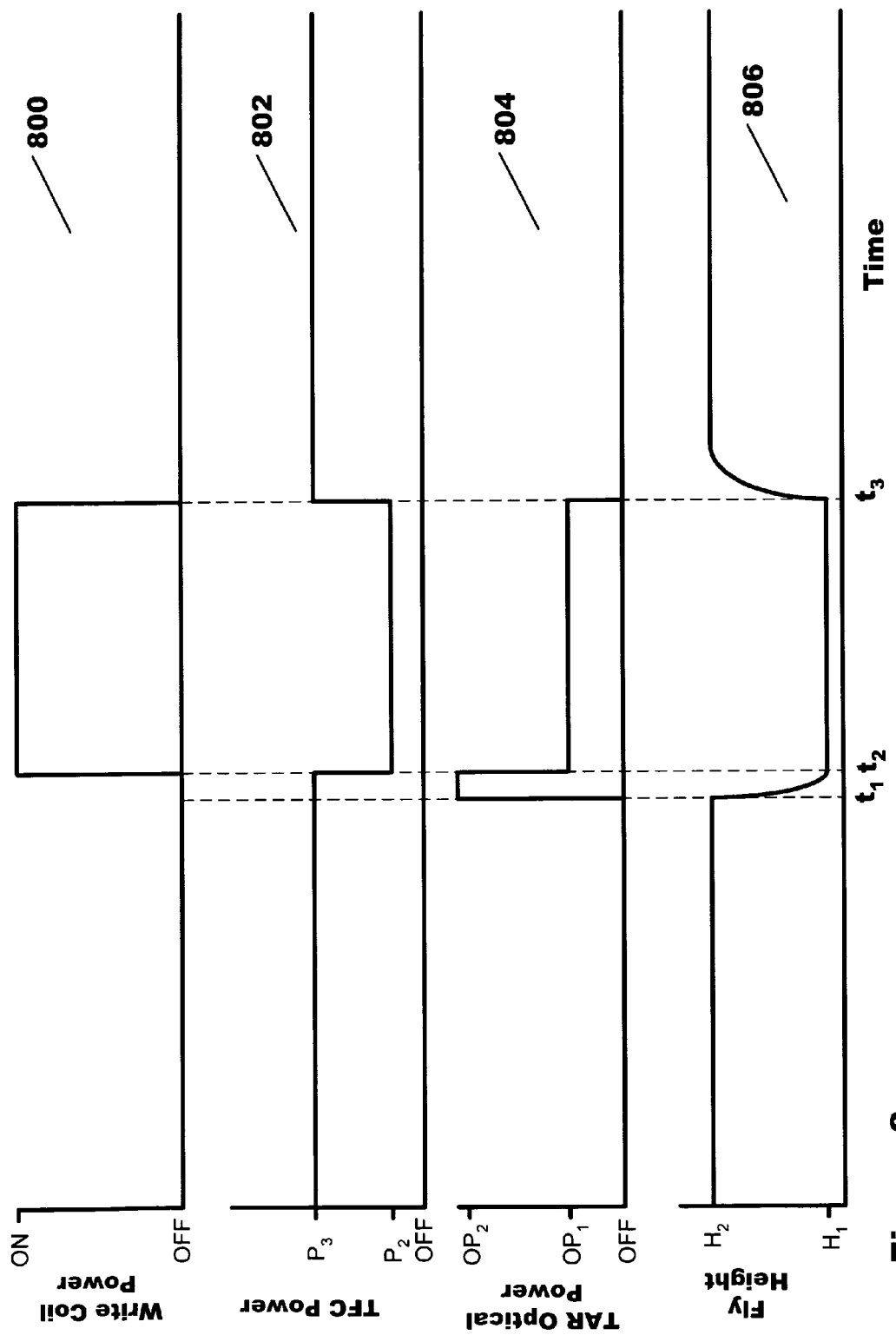
FIG. 8 is a sequence of charts 800, 802, 804, and 806 illustrating write coil power, resistive TFC power, TAR optical power, and fly height as a function of time during a data write cycle, in accordance with an embodiment of the present invention.

FIG. 8 is a sequence of charts 800, 802, 804, and 806 illustrating write coil power, resistive TFC power, TAR optical power, and fly height as a function of time during a data write cycle, in accordance with the forgoing embodiments of the present invention. In the following discussion, TFC power is power delivered to resistive heaters (separate from the write coils) imbedded somewhere in the slider structure that contains the read/write thin film head. The reference "TFC" is associated with the embedded resistive heaters to maintain consistency with prior terminology, even though the thermal fly height control system of the present invention includes control of all energy sources including TAR optical power and coil power. TAR optical power is power delivered by the optical waveguide to the near field light source. Chart 800 shows average write coil power as data is being written between times $t_2$ and $t_3$. Resistive heater TFC power is shown in chart 802. Prior to the beginning of the data write cycle at $t_2$, TFC power is at a nominal level of $P_3$, which causes the head to fly at height $H_2$ (see chart 806). During the write cycle between times $t_2$ and $t_3$, TFC power is reduced to power level $P_2$ to compensate for increased power levels from the write coil and TAR optical power. In some cases, power level $P_2$ can be close to zero, but it is desirable to have $P_2$ at some minimum power level, so that the control system has some capability to trim the fly height $H_1$ during the data write cycle between $t_2$ and $t_3$. The trimming may be necessary to compensate for changes in atmospheric pressure or ambient temperature. Power level $P_2$ can also be varied as a function of the average write coil power, which of course may change depending on the profile of the data being written in a particular sector. This feature of the present invention is an improvement over the process shown in FIG. 7 (Prior Art), wherein the TFC power is turned off during the data write cycle, and the fly height $H_1$ is determined solely by the coil power. The trimming may also be accomplished by adjusting the TAR optical power around the value $OP_1$, but this may not as desirable due to the impact on media surface heating and the TAR process itself. Subsequent to the write cycle (times>$t_3$), TFC power is returned to a power level of $P_3$.

TAR optical power is shown in chart 804. Just prior to the beginning of the write cycle at $t_1$, a pulse of optical power, having a peak level of $OP_2$, is supplied by the TAR system. The duration of the pulse is $t_2-t_1$, the amplitude may vary from about $2 \times OP_1$ to $10 \times OP_1$. The pulse would result in higher energy being delivered to the media via the near field light source, but this is in an area on the media where no data is being written. Since the near field light sources are about 10% efficient, most of the light energy delivered by the optical waveguide is converted to heat by metal layer 320, and conducted to the head structures near the ABS. Due to the proximity of metal layer 320 to the ABS, the time required to change the head temperature near the ABS, which impacts the degree of protrusion of the head, is considerably reduced, when compared to the transient response time resulting from a power increase to the resistive heaters of a conventional TFC system. Thus the pulse duration $t_2-t_1$ of the present embodiment of the present invention is considerably shorter than that of FIG. 7 (Prior Art). The improved thermal transient response of the present invention produces a faster transition from fly height $H_2$ to $H_1$, allowing faster head transitions to the data write zones on the media.

Chart 806 illustrates the changes in fly height that result from the thermal inputs to the thin film head of the present invention. Prior to the data write cycle, the fly height controlled at $H_2$ to minimize contact with surface asperities that could damage the head. However, fly height $H_2$ is too far from the media surface for reliable data writing. Between times $t_1$ and $t_2$, the thermal pulse produced by the TAR system rapidly increases the head temperature, causing the air bearing surface of the head to protrude further toward the media surface, changing the fly height to $H_1$ at time $t_2$. Between times $t_2$ and $t_3$, data is being written to the media, and the fly height is maintained at $H_1$ by the combined thermal inputs from the coil power, TAR optical power, and the resistive heater TFC power.

One concern regarding the use of the TAR waveguide to input the power pulse between times of $t_1$ and $t_2$ (FIG. 8) stems from the fact that such a pulse will significantly heat the media surface above levels normally used in thermally assisted recording. The higher temperatures may damage the media, which is undesirable, even though it may be in regions where no data is present. To address this concern, but still maintain the advantages of optical heating, the following embodiments of the present invention are provided.

Figure 3C:
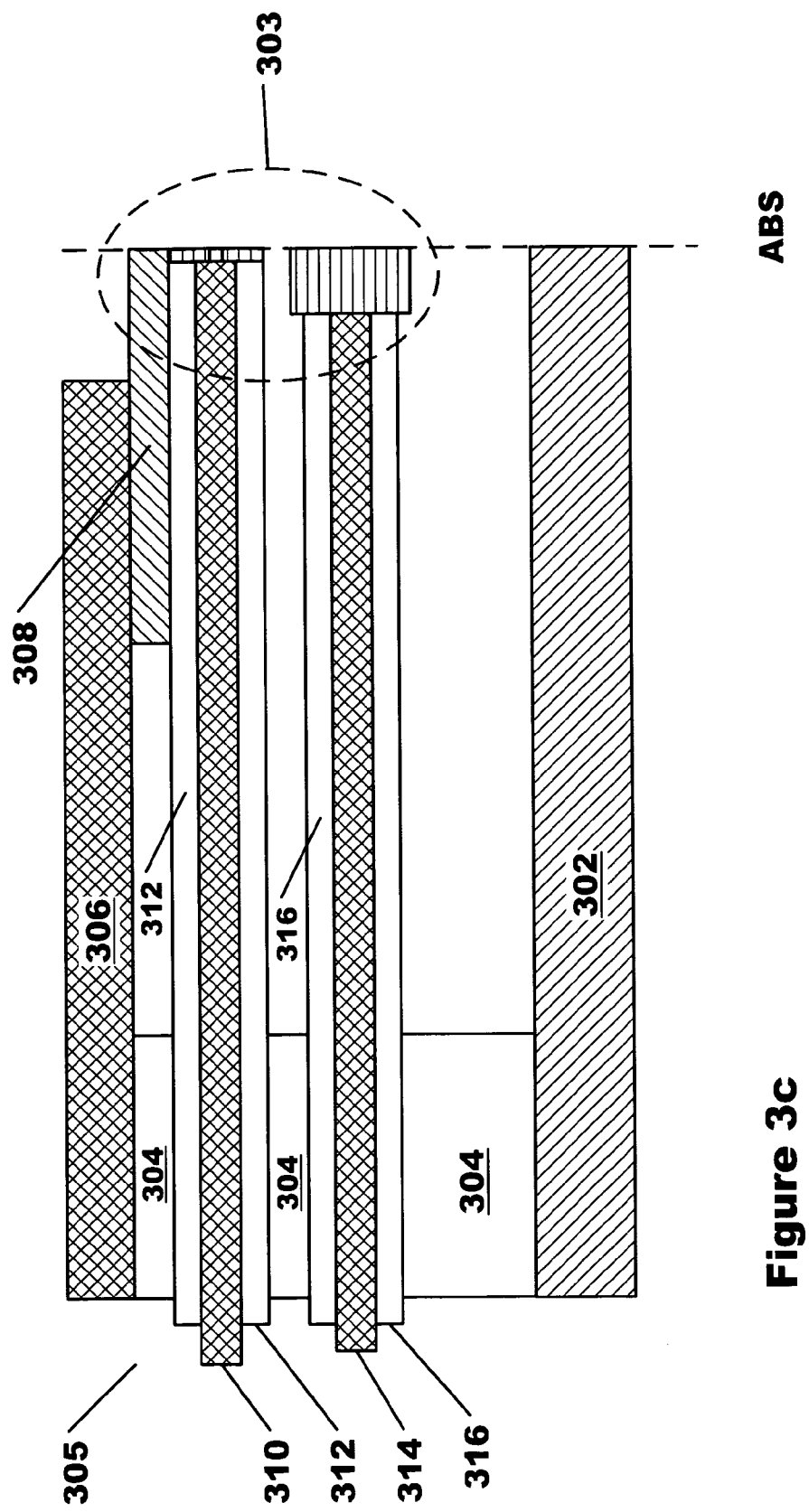
FIG. 3c is a partial cross section view of a thin film head having resistive heating TFC, TAR, and an auxiliary optical heating source, in accordance with an embodiment of the present invention.
Figure 3D:
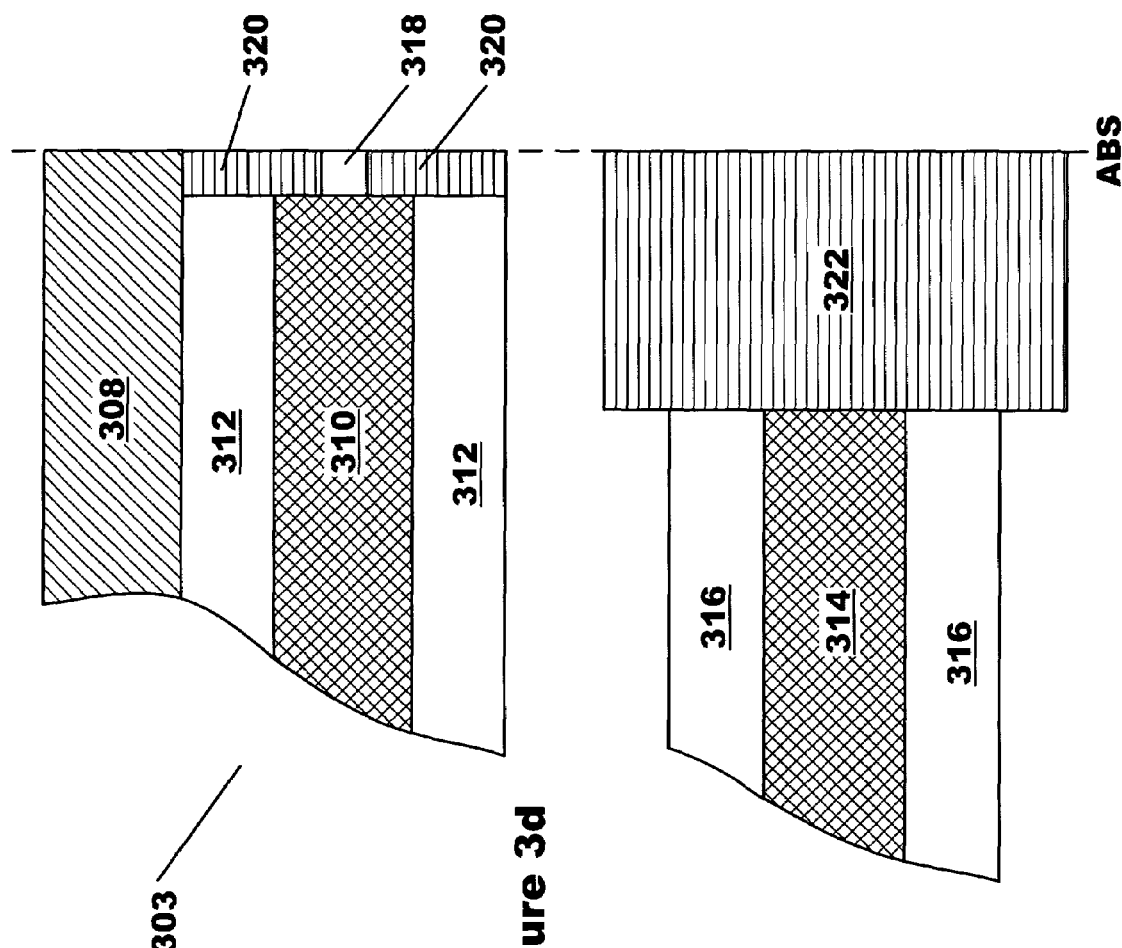
FIG. 3d is a partial cross section view of detail 303 of FIG. 3c, in accordance with an embodiment of the present invention.
Figure 4B:
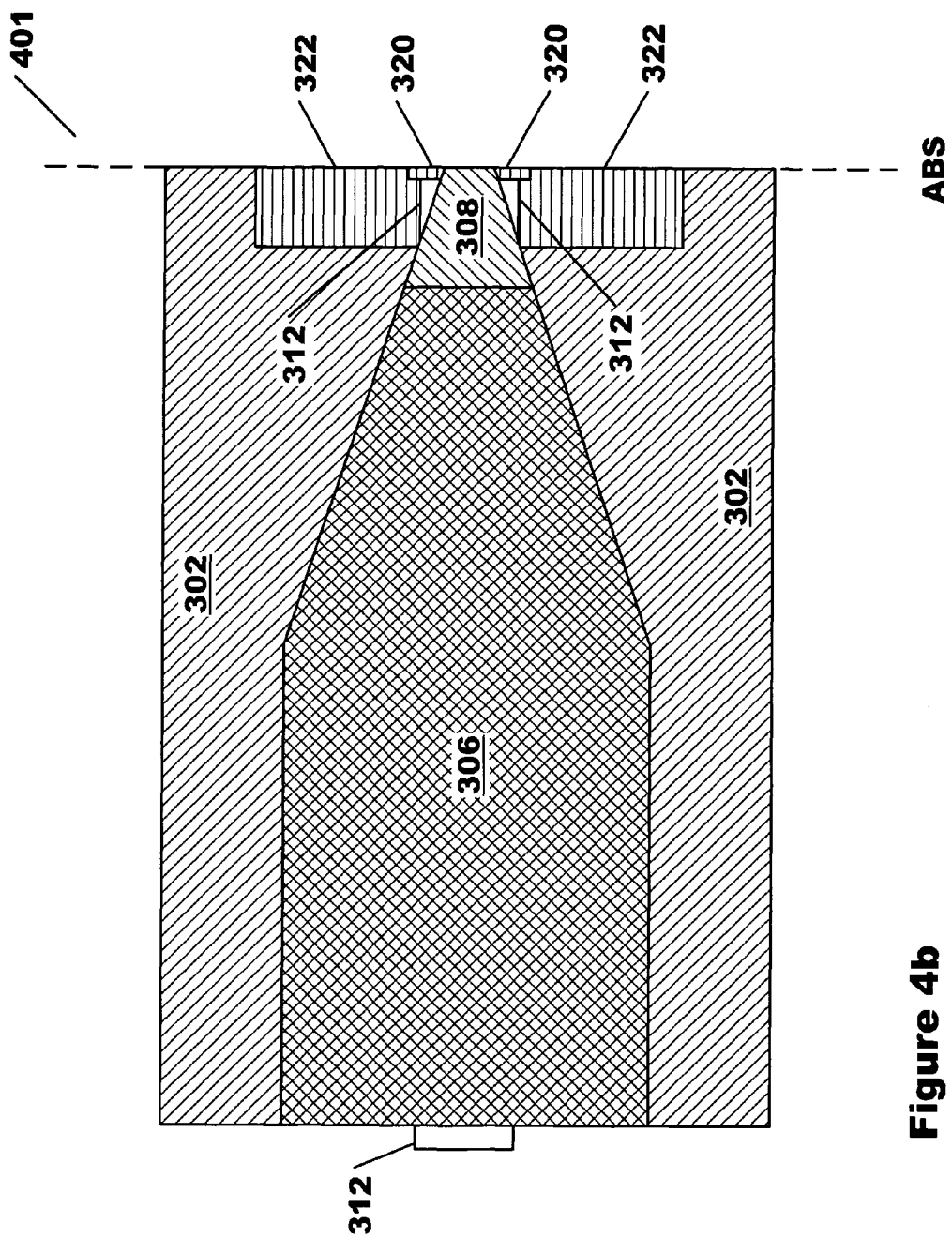
FIG. 4b is a partial plan view of the thin film head of FIG. 3c, in accordance with an embodiment of the present invention.
Figure 5B:
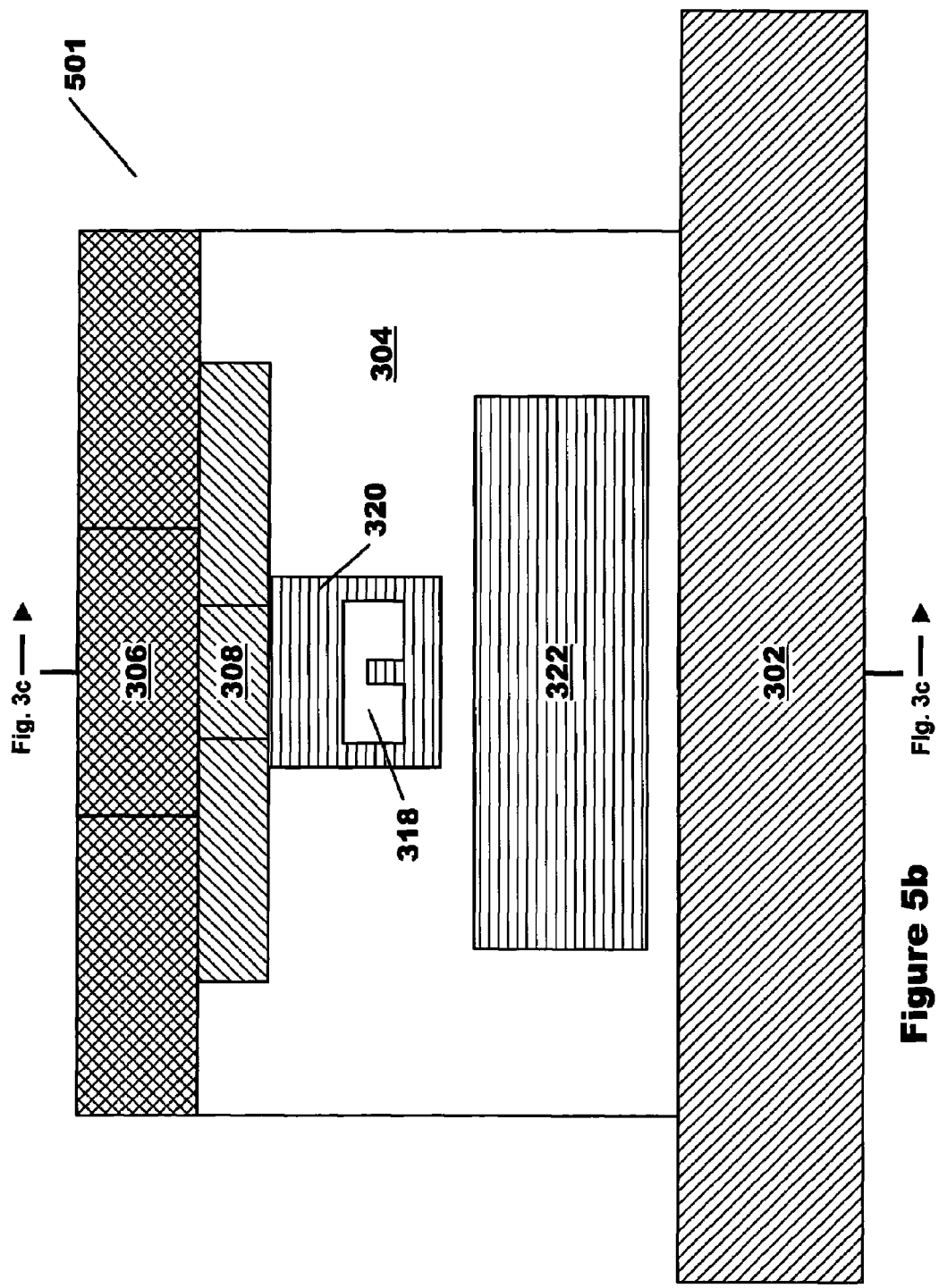
FIG. 5b is a partial air bearing surface view of the thin film head of FIG. 3c, in accordance with an embodiment of the present invention.

Returning to FIG. 3c, which is a partial cross section view 305 of a thin film head having resistive heating TFC, TAR, and an auxiliary optical heating source, in accordance with an embodiment of the present invention. In this embodiment, an additional optical waveguide having an optical waveguide core 314 enclosed in cladding layers 316, is introduced to provide additional power to the head structure near the ABS. The auxiliary optical heat source also includes a laser light source (not shown) coupled to optical waveguide core 314 by suitable optically transparent conduit (not shown) in accordance with methods well known in the art. In one embodiment of the present invention, the laser light source for auxiliary optical heating source may be different, and separate from, the laser light source used by the TAR system. In another embodiment of the present invention, the same laser light source is used for both TAR and the auxiliary optical heating source, being optically switched between optical waveguide cores 314 and 310 in accordance with methods known in the art. The preheat power pulse is supplied by the auxiliary optical heating source, which removes any potential media damage overheating via the TAR waveguide. In FIG. 3c, the auxiliary optical heating source is shown placed below the TAR waveguide, but it may be placed in many other locations (such as parallel to the TAR waveguide) as would be recognized by those skilled in the art. FIG. 3d is a partial cross section view of detail 303 of FIG. 3c, in accordance with an embodiment of the present invention. Structure 322 serves the functions of (1) absorbing light energy transmitted by waveguide 314 and converting this energy to heat, and (2) dispersing the heat energy to surrounding head structures. In FIG. 3d, heat dissipating structure 322 extends to the ABS, but this is not a strict requirement, as the termination of the auxiliary optical waveguide 314, 316 and structure 322 may be placed in any suitable location chosen to optimize heat transfer to the thin film head structures. Structure 322 may be constructed of any appropriate material having a suitable surface emissivity for light absorption, and a suitable thermal conductivity, such as a metal or DLC (diamond like carbon). Preferably, structure 322 is a metal, more preferably copper. FIG. 4b is a partial plan view 401 of the thin film head of FIG. 3c, in accordance with an embodiment of the present invention. The details are not to scale. Structure 322 is shown having a width greater than that of layer 320, the metal layer surrounding the C aperture of the near field light source. While this is likely to be the case, it is not required. The actual dimensions of heat dissipating structure 322, as well as its location, may be optimized to maximize heat transfer to the head structure, in accordance with principles well known to those skilled in the art. FIG. 5b is a partial air bearing surface view 501 of the thin film head of FIG. 3c, in accordance with an embodiment of the present invention. In FIG. 5b, heat dissipating structure 322 is shown placed below the near field light source 320, 318, but it may be placed in many other locations (such as parallel to the near field light source on the left or right) as would be recognized by those skilled in the art.

Figure 6:
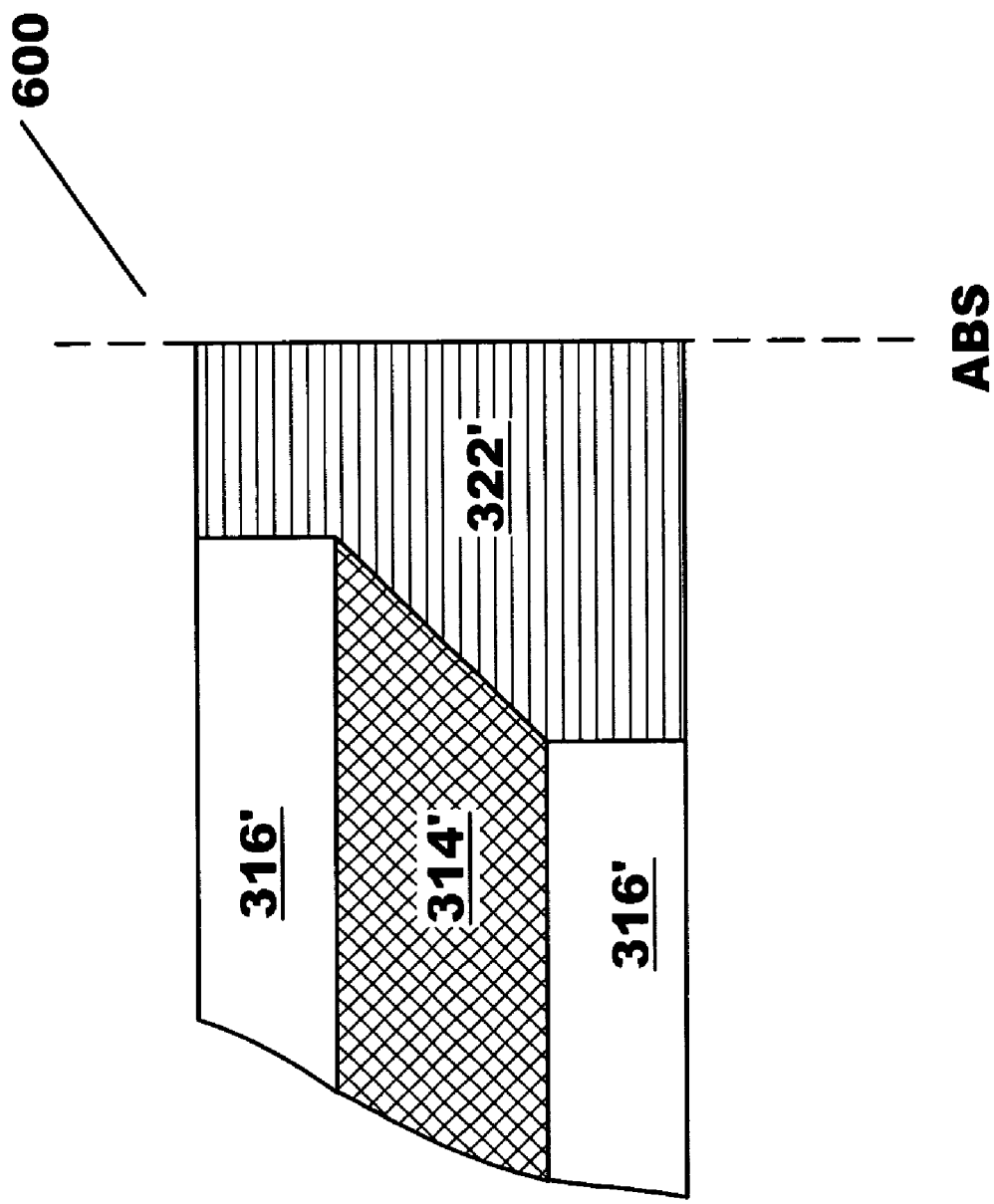
FIG. 6 is a partial cross section view of the terminating end of an auxiliary optical heating source, in accordance with another embodiment of the present invention.

FIG. 6 is a partial cross section view 600 of the terminating end of an auxiliary optical heating source, in accordance with another embodiment of the present invention. In this embodiment, optical waveguide core 314' (enclosed in cladding layer 316') is terminated at an angle to increase the surface area between the terminating end of the optical waveguide core 314' and heat dissipating structure 322'. The increased surface area serves to aid in the adsorption light from the optical core 314'.

Figure 9:
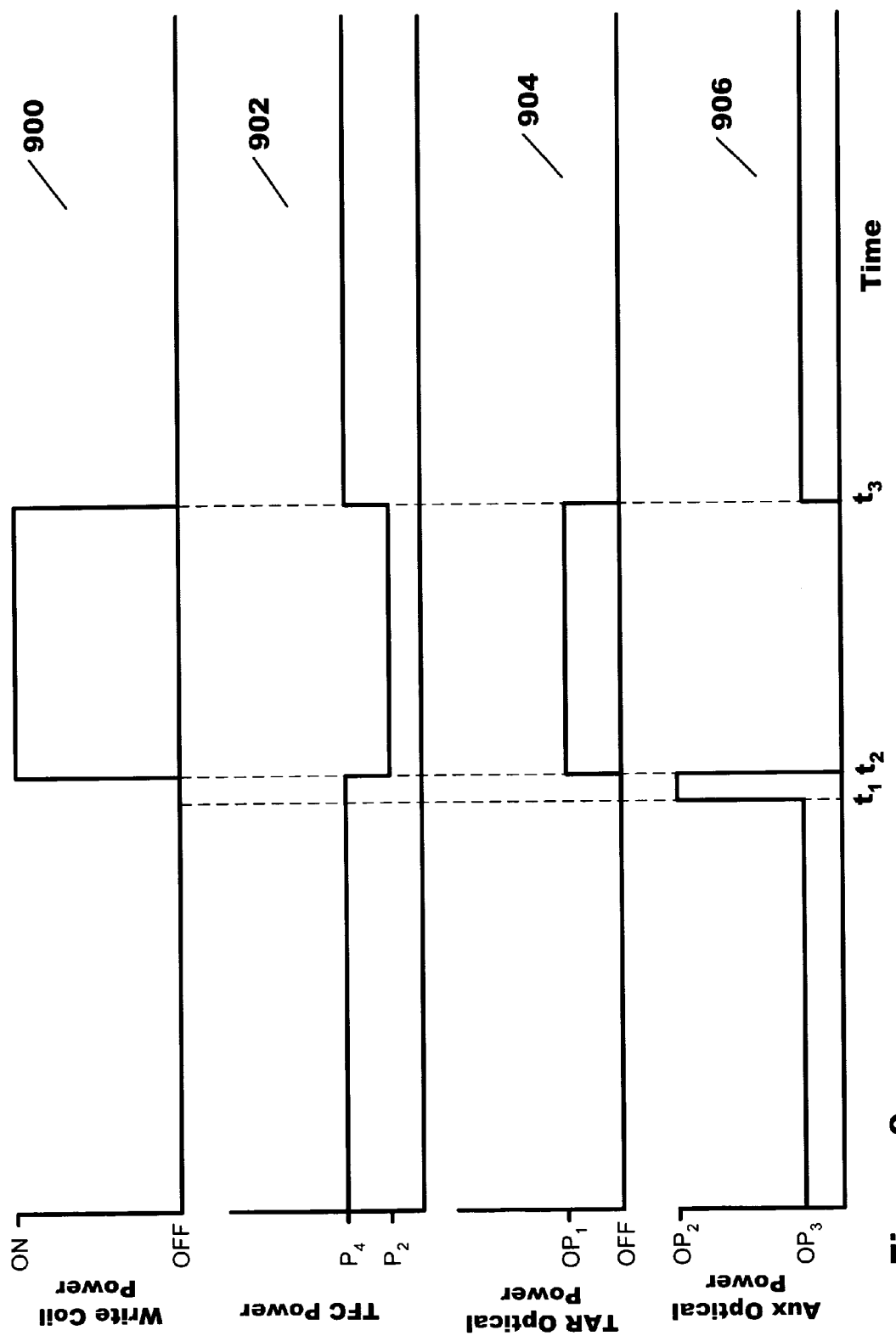
FIG. 9 is a sequence of charts 900, 902, 904, and 906 illustrating write coil power, resistive TFC power, TAR optical power, and auxiliary optical power as a function of time during a data write cycle, in accordance with an embodiment of the present invention; and, FIG. 10 is a sequence of charts 1000, 1002, and 1004 illustrating write coil power, TAR optical power, and auxiliary optical power as a function of time during a data write cycle, in accordance with an embodiment of the present invention.

FIG. 9 is a sequence of charts 900, 902, 904, and 906 illustrating write coil power, resistive TFC power, TAR optical power, and auxiliary optical power as a function of time during a data write cycle, in accordance with the embodiments of FIGS. 3c, 3d, 4b, 5b, and 6 of the present invention. Chart 900 illustrates the application of average write coil power during the write cycle between time t2 and t3. Chart 902 illustrates the resistive TFC heater power levels. Prior to the beginning of the data write cycle at $t_2$, TFC power is at a nominal level of $P_4$. During the write cycle between times $t_2$ and $t_3$, TFC power is reduced to power level $P_2$ to compensate for increased power levels from the write coil and TAR optical power. In some cases, power level $P_2$ can be close to zero, but it is desirable to have $P_2$ at some minimum power level, so that the control system has some capability to trim the fly height during the data write cycle between $t_2$ and $t_3$. Power level $P_2$ can also be varied as a function of the average write coil power, which of course may change depending on the profile of the data being written in a particular sector. Subsequent to the write cycle (times>$t_3$), TFC power is returned to a power level of $P_4$. Chart 904 illustrates the TAR optical power. In this embodiment of the present invention, the TAR waveguide and near field source are not used to produce the preheat pulse shown in chart 804 of FIG. 8. The TAR power is only used to aid in writing data, being turned on at a power level of $OP_1$ between times $t_2$ and $t_3$. This avoids any media overheating, or accidental erasure of data when media surface temperatures reach the paramagnetic limit in zones outside the intended sector. Chart 906 illustrates the auxiliary optical system power levels. Prior to time $t_1$, a minimum power level $OP_3$ is provided. This power level may be used to supplement TFC power if desired to aid in fly height fine tuning, or may optionally be set to zero if fly height control is to be maintained solely with TFC power. Between times $t_1$ and $t_2$, a preheat pulse is applied to a power level $OP_2$, as was done previously in FIG. 8. During the write cycle between $t_2$ and $t_3$, the auxiliary optical power is turned off, as the fly height is trimmed with resistive heating TFC power combined with TAR optical power and write coil power. In this case, TFC power is utilized to fine tune fly height. Optionally, the auxiliary optical power may also be utilized to trim fly height for faster response changes if desired. Although a separate chart illustrating fly height as a function of time is not shown in FIG. 9, chart 806 can be utilized to obtain the same information.

Figure 10:
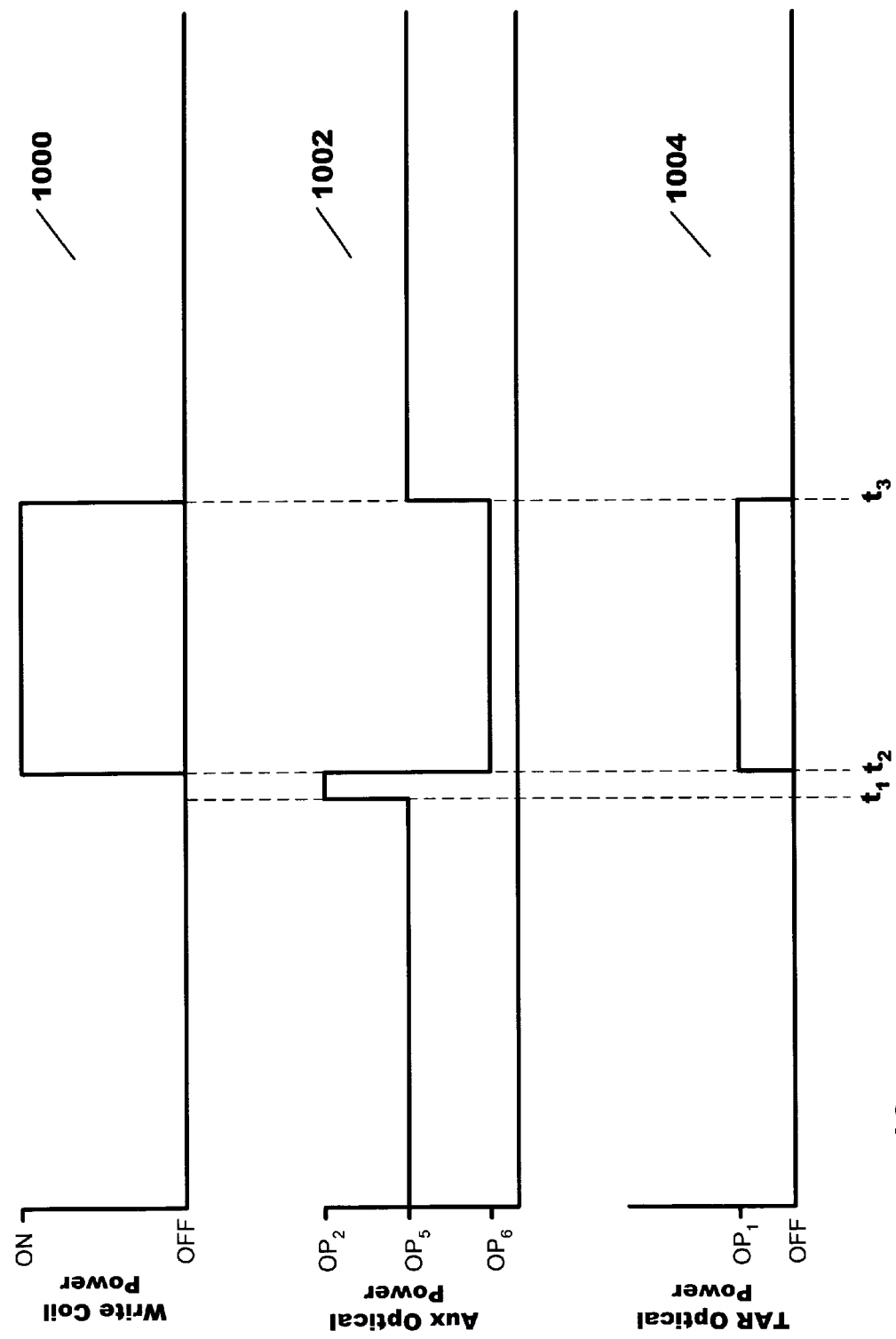

An additional embodiment providing lower cost and simplified construction can be derived from the present invention by eliminating the resistive heaters of the TFC, replacing them with optical heating from the auxiliary optical waveguide. This embodiment would be in accordance with the illustrations provided in FIGS. 3c, 3d, 4b, 5b, and 6 of the present invention. FIG. 10 is a sequence of charts 1000, 1002, and 1004 illustrating write coil power, TAR optical power, and auxiliary optical power as a function of time during a data write cycle, in accordance with the forgoing embodiment of the present invention. Chart 1000 illustrates the application of average write coil power during the write cycle between time $t_2$ and $t_3$. Chart 1002 illustrates the application of auxiliary optical power. Prior to time $t_1$, an auxiliary optical power level of $OP_5$ is provided to adjust the fly height to $H_2$. A preheat pulse is applied between $t_1$ and $t_2$ at a level of $OP_2$. The power level is dropped to $OP_6$ to trim the fly height to $H_1$ during the write cycle between $t_2$ and $t_3$. In this embodiment, the fly height in both inside and outside the write cycle is controlled by the application of auxiliary optical power, as opposed to resistive heating power. TAR optical power is utilized only for thermally assisted recording, which avoids undue media surface heating, as shown in chart 1004. The present embodiment maintains the faster response of optical heating, while providing reduced cost and simplified construction through the elimination of the resistive heaters.

The foregoing description accompanying FIGS. 1000, 1002, and 1004 is applicable for the case of different and separable laser sources for TAR and auxiliary optical heating systems. For the case of a single laser source, a splitting device that can direct all light to the TAR system, all light to the auxiliary optical heating system, or a proportionate amount of light to each of both systems is required. In the alternative, for a splitter than can only direct light to one system at a time, power level $OP_6$ of the auxiliary optical heating system in FIG. 1002 can be reduced to zero, compensating by increasing power level $OP_1$ of the TAR system in FIG. 1004, for times between $t_2$ and $t_3$.

Although the foregoing embodiments disclose generic thin film perpendicular write heads, it will be recognized by those of ordinary skill in the art, that such designs are equally applicable to thin film longitudinal write heads, and perpendicular thin film heads having shield structures, with minor modification.

The present invention is not limited by the previous embodiments heretofore described. Rather, the scope of the present invention is to be defined by these descriptions taken together with the attached claims and their equivalents.

What is claimed is:

1. A method for writing data with a thin film magnetic head having a thermally assisted recording system and an auxiliary optical system operable to heat said thin film magnetic head, comprising:

providing a first optical power level to said auxiliary optical system between a first time $t_1$ and a second time $t_2$;

providing a second optical power level to said auxiliary optical system between said second time $t_2$ and a third time $t_3$, said first optical power level being greater than said second optical power level; and, providing a third optical power level to said thermally assisted recording system between said second time $t_2$ and said third time $t_3$; and, writing data between said second time $t_2$ and said third time $t_3$.

2. The method as recited in claim 1, wherein said first optical power level is between 2 and ten times said third optical power level.

3. The method as recited in claim 1, wherein said first optical power level is between 2 and ten times said second optical power level.

4. The method as recited in claim 1, further comprising:

providing a fourth optical power level to said auxiliary optical system for times less than said second time $t_2$ and for times greater than said third time $t_3$.

5. The method as recited in claim 4, wherein said fourth optical power level is greater than said second optical power level.

6. The method as recited in claim 1, wherein a fly height of said thin film magnetic head is reduced from a first fly height at said first time $t_1$ to a second fly height at said second time $t_2$.

7. The method as recited in claim 6, wherein said second fly height is adjusted between said second time $t_2$ and said third time $t_3$ by altering said second optical power level to said auxiliary optical system.

8. The method as recited in claim 6, wherein said second fly height is adjusted between said second time $t_2$ and said third time $t_3$ by altering said third optical power level to said thermally assisted recording system.

9. The method as recited in claim 6, wherein said second fly height is adjusted between said second time $t_2$ and said third time $t_3$ by altering said third optical power level to said thermally assisted recording system, and said second optical power level to said auxiliary optical system.

* * * * *